(12) United States Patent
Mattsson

(10) Patent No.: US 9,250,345 B2
(45) Date of Patent: Feb. 2, 2016

(54) REDUCED-DRAG TOWING OF GEOPHYSICAL EQUIPMENT

(71) Applicant: PGS Geophysical AS, Lysaker (NO)

(72) Inventor: Anders Goran Mattsson, Singapore (SG)

(73) Assignee: PGS Geophysical AS, Oslo (NO)

(*) Notice: Subject to any disclaimer, the term of this patent is extended or adjusted under 35 U.S.C. 154(b) by 356 days.

(21) Appl. No.: 13/831,503

(22) Filed: Mar. 14, 2013

(65) Prior Publication Data
US 2014/0269176 A1    Sep. 18, 2014

(51) Int. Cl.
*G01V 1/38* (2006.01)
*G01V 1/20* (2006.01)

(52) U.S. Cl.
CPC ............ *G01V 1/3817* (2013.01); *G01V 1/3843* (2013.01); *G01V 2001/207* (2013.01)

(58) Field of Classification Search
CPC .............. G01V 1/3817; G01V 1/3843; G01V 2001/207
USPC ........................................................ 367/16
See application file for complete search history.

(56) References Cited

U.S. PATENT DOCUMENTS

| 4,367,967 A * | 1/1983 | Albert, Jr. ................... 403/41 |
| 4,719,987 A * | 1/1988 | George et al. ............... 181/114 |
| 2010/0149910 A1 | 6/2010 | Martin |
| 2012/0257474 A1 | 10/2012 | Cambois et al. |

FOREIGN PATENT DOCUMENTS

| EP | 0018053 | 10/1980 |
| EP | 0018053 A1 | 10/1980 |
| GB | 2142432 A | 1/1985 |

OTHER PUBLICATIONS

Search Report issued by the United Kingdom Intellectual Property Office for patent application GB 1404165.9, mailed on Jul. 30, 2014, 3 pages.

* cited by examiner

*Primary Examiner* — Daniel L Murphy
(74) *Attorney, Agent, or Firm* — Patterson & Sheridan, LLP (57) ABSTRACT

Techniques are disclosed relating to reducing drag on cables towed behind a vessel in a body of water. In one embodiment, an apparatus includes a signal source coupled to a survey vessel via a source cable, and the source cable includes a plurality of floats along its length. The floats may in some embodiments allow the source cable to be lifted partially, substantially, or entirely above the surface of the water. Lifting the cable above the surface of the water may in turn decrease the amount of hydrodynamic drag on the cable, reducing the force necessary (e.g., from lateral deflectors on the cable or at the signal source) to tow the source and/or the force necessary to attain a desired lateral position for the signal source. The disclosed techniques may in some embodiments be used to tow such sources at relatively wide lateral separations.

18 Claims, 5 Drawing Sheets

REDUCED-DRAG TOWING OF GEOPHYSICAL EQUIPMENT

BACKGROUND

1. Technical Field

The disclosure relates generally to the field of marine geophysical surveying. More particularly, this disclosure relates to systems and methods for reducing drag on cables used in marine geophysical surveying.

2. Description of the Related Art

Marine geophysical surveying systems, such as seismic acquisition systems and electromagnetic survey systems, are used to acquire geophysical data from formations disposed below the bottom of a body of water, such as a lake or the ocean. One type of survey, a marine seismic survey, is based on the use of sound waves. In such a survey, a vessel may tow one or more acoustic sources (e.g., an air gun) and a plurality of streamers along which a number of sensors (e.g., hydrophones) are located. Sound waves generated by the source may then be transmitted to the earth's crust and then reflected back by various strata and detected at the sensors. Sound waves received during a marine seismic survey may be analyzed to locate hydrocarbon-bearing geological structures, and thus determine where deposits of oil and natural gas may be located. In a similar fashion, marine electromagnetic (EM) surveys may be conducted using EM signals transmitted by, for example, a submerged antenna and detected by EM receivers.

In the example of marine seismic surveying, the surveying systems typically include a seismic survey vessel having onboard navigation, seismic signal source control, and geophysical data recording equipment. The seismic survey vessel is typically configured to tow one or more (typically a plurality of) laterally spaced sensor streamers through the water. At selected times, the seismic signal source control equipment causes one or more seismic signal sources (which may be towed in the water by the seismic vessel or by another vessel) to actuate. Signals generated by various sensors on the one or more streamers in response to detected seismic energy are ultimately conducted to the recording equipment. A record is made in the recording system of the signals generated by each sensor (or groups of such sensors). The recorded signals may be interpreted to infer the structure and composition of the formations below the bottom of the body of water. Corresponding components for inducing electromagnetic fields and detecting electromagnetic phenomena originating in the subsurface in response to such imparted fields may also be used in marine electromagnetic geophysical survey systems.

In some embodiments, it may be advantageous for the geophysical survey sources to be towed at relatively wide lateral separations (e.g. relatively wide separations from other survey sources, or relatively wide separations from a central axis of the survey vessel). Certain marine geophysical surveying systems and a discussion of some advantages of wide source tow are provided in U.S. Patent Application Publication No. 2012/0257474, which is incorporated by reference herein. Reducing hydrodynamic drag on sources and source cables may be advantageous in attaining relatively wide tow of such sources. Further, even in embodiments that do not involve wide tow of sources (e.g., sources directly behind a survey vessel, or sources at relatively small lateral separations from a central axis thereof), it may be desirable to reduce the hydrodynamic drag acting on the sources and/or source cables.

SUMMARY

Techniques are disclosed herein relating to reducing drag on a device (e.g., a geophysical survey signal source) and/or on a cable connecting such a device to a vessel. This may in some embodiments be advantageous in controlling the lateral displacement of the device when it is towed in a body of water. In some embodiments, drag may be reduced by lifting a cable connecting the device to the tow vessel, such that the cable is disposed above the surface of the water in which the device is towed. In various embodiments, this may allow for a relatively wide separation of devices and/or a relatively large lateral displacement for the device relative to a center line of the tow vessel.

An apparatus according to one aspect of this disclosure includes a survey source cable connectable to a survey vessel and towable therebehind in a body of water, wherein the survey source cable is further connectable to a survey source. The apparatus further includes a plurality of floats arranged along the survey source cable, wherein the floats include a corresponding plurality of lateral deflectors operable to impart lateral force to the survey source cable. In this apparatus, the plurality of floats are operable to lift the survey source cable at least partially out of the body of water.

A method according to one aspect of this disclosure includes towing a cable behind a survey vessel in a body of water. In this method, the cable includes, at selected positions therealong, a plurality of buoyant members, the buoyant members including lateral deflectors. Further, in this method, the plurality of buoyant members lift at least a portion of the cable above a surface of the body of water, potentially reducing drag on the cable.

A system according to one aspect of this disclosure includes a plurality of cables towable behind a survey vessel in a body of water, and a corresponding plurality of marine seismic sources connectable to the plurality of cables. In this system, the cables include a plurality of flotation devices at selected positions therealong, and the flotation devices including wings. Further in this system, the flotation devices are operable to position portions of the cables at a height above a surface of the body of water, and the wings are operable to position the cables at selected lateral positions.

DETAILED DESCRIPTION

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Based On." As used herein, this term is used to describe one or more factors that affect a determination. This term does not foreclose additional factors that may affect a determination. That is, a determination may be solely based on those factors or based only in part on those factors. Consider the phrase "determine A based on B." This phrase connotes that B is a factor that affects the determination of A, but it does not foreclose the determination of A from also being based on C. In other instances, A may be determined based solely on B.

"Configured To" or "Operable To." As used herein, these terms means that a particular piece of hardware or software is arranged to perform a particular task or tasks when operated. Thus, a statement that a system is "configured to" or "operable to" perform task A means that the system may include hardware and/or software that, during operation of the system, performs or can be used to perform task A. (As such, a system can be "configured to" or "operable to" perform task A even if the system is not currently operating.) The units/circuits/components used with such language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

"Coupled." As used herein, this term includes a connection between components, whether direct or indirect.

* * *

The present disclosure describes various embodiments in which geophysical equipment is towed behind a survey vessel. For example, one or more survey signal sources may be towed behind a survey vessel, typically in conjunction with one or more streamers. As used herein, the term "signal source" refers to an apparatus that is configured to emit a signal (e.g., acoustic, electromagnetic, etc.) that may be reflected from one or more underlying structures and then measured. As used herein, the term "streamer" refers to an apparatus that may be towed behind a vessel to detect such signals, and thus may include detectors, sensors, receivers, and/or other structures configured to measure the reflected signal (e.g., by using hydrophones, geophones, electrodes, etc. positioned along or in proximity to the streamer).

Figure 1:
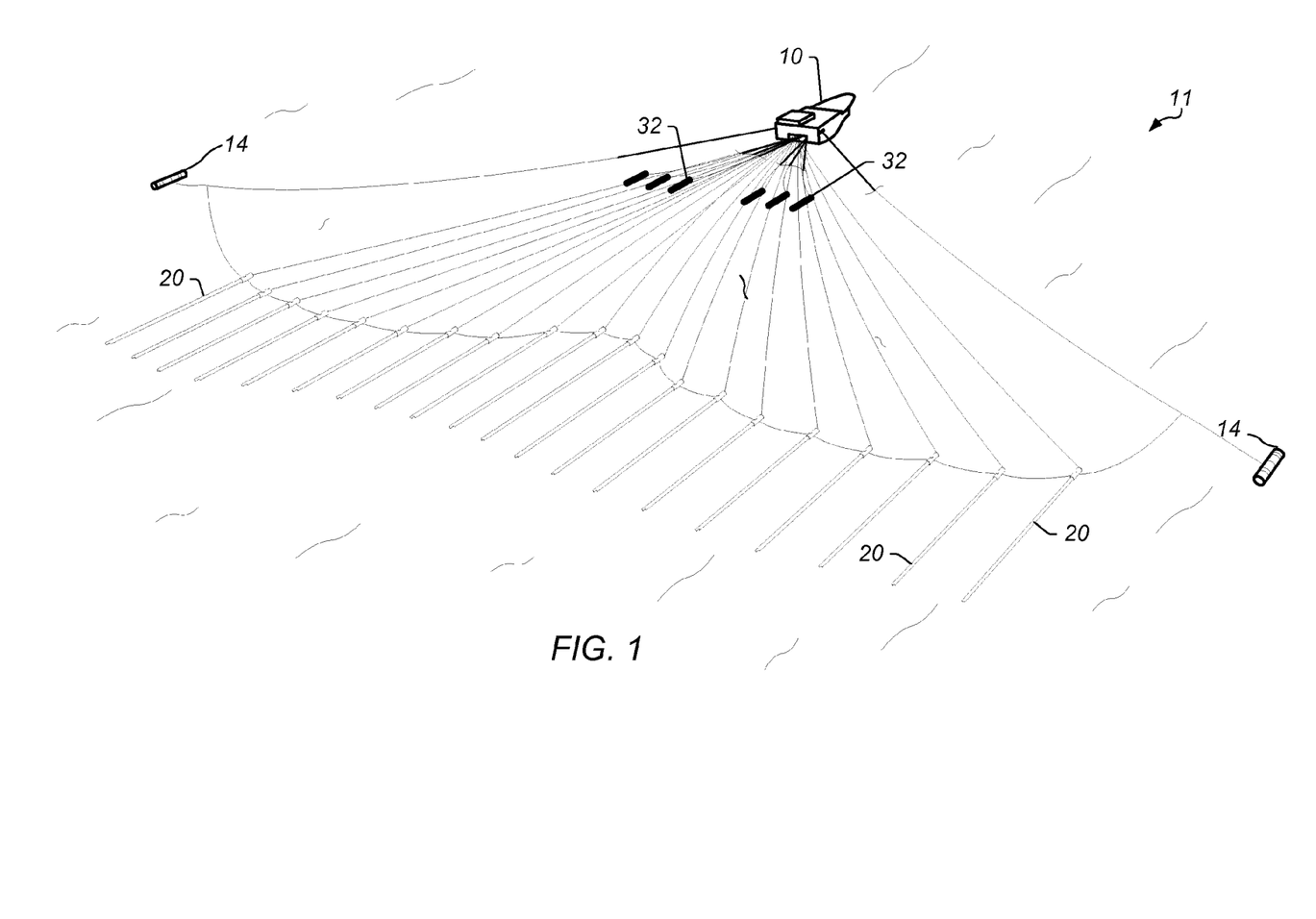
FIG. 1 depicts a perspective view of a vessel towing an array of streamers and sources.
Figure 2:
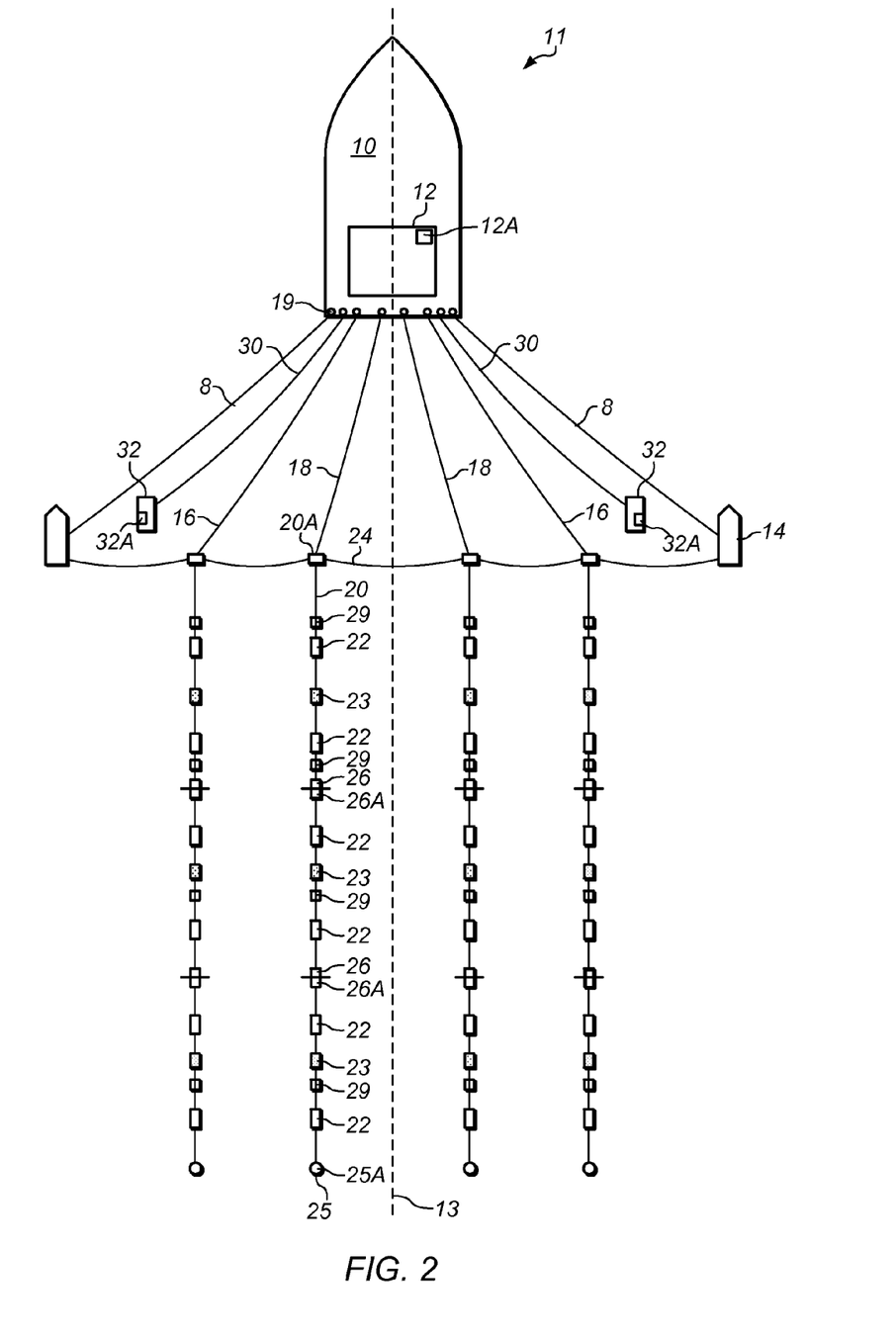
FIG. 2 depicts a top view of a vessel towing an array of streamers and sources.

Turning now to FIGS. 1 and 2, a typical marine geophysical survey system is shown. The geophysical survey system includes survey vessel 10 that moves along the surface of body of water 11 (e.g., an ocean or a lake) while towing streamers 20 and signal sources 32. Survey vessel 10 may include thereon surveying and/or recording equipment, shown generally at 12 and for convenience collectively referred to as a "recording system." Recording system 12 typically includes devices such as a data recording unit (not shown separately) for making a record with respect to time of signals generated by various sensors in the acquisition system. Recording system 12 may also include streamer control equipment and signal source control equipment (not shown separately) for operating, respectively, streamers 20 (connected to survey vessel 10 by lead-in cables 16, 18) and signal sources 32 (connected to survey vessel 10 by source cables 30). As shown in FIG. 2, midline 13 bisects survey vessel 10. Midline 13 may be used in various aspects of lateral steering of streamers 20 and signal sources 32 to define the positions of components. For example, the "lateral position" of signal sources 32 may be defined relative to midline 13 of survey vessel 10.

Signal sources 32 may be any type of source known in the art. Further, each element referred to as "signal source 32" may in some embodiments include a single signal source or an array of multiple signal sources. For example, signal source 32 may include a plurality of air guns. Thus the term "signal source" may thus refer to a single signal source or a module that includes a plurality of signal sources. In various embodiments, a survey system may include none, one, or any appropriate number of towed signal sources 32. For example, FIG. 1 shows six signal sources 32, and FIG. 2 shows two signal sources 32. In some embodiments, a second survey vessel (not shown) may tow one or more signal sources 32.

Signal sources 32 may include, for example, air guns, marine vibrators, explosives, plasma sound sources, electromagnetic sources, or any other signal source suitable for the particular geophysical survey in consideration. Recording system 12 may also include navigation equipment (not shown separately) to determine and record, at selected times, the geodetic position of survey vessel 10, a plurality of signal sources 32, and a plurality of geophysical sensors 22 disposed at spaced-apart locations on streamers 20 towed by survey vessel 10.

In one embodiment, the device for determining the geodetic position of the survey vessel may be geodetic position signal receiver 12A such as a Global Positioning System (GPS) receiver, a Global Navigation Satellite System (GLONASS) receiver, a Long Range Navigation (LORAN) receiver, etc., shown schematically at 12A. Other geodetic position determination devices are known in the art, such as other global navigation satellite systems. The foregoing elements of recording system 12 are familiar to those skilled in the art, and with the exception of geodetic position detecting receiver 12A, are not shown separately in the figures herein for clarity of the illustration.

Geophysical sensors 22 may be any type of geophysical sensor known in the art. Non-limiting examples of such sensors may include particle-motion-responsive seismic sensors such as geophones and accelerometers, pressure-responsive seismic sensors, pressure-time-gradient-responsive seismic sensors, electrodes, magnetometers, temperature sensors or combinations of the foregoing.

In various implementations of the disclosure, geophysical sensors 22 may measure, for example, seismic or electromagnetic field energy primarily reflected from or refracted by various structures in the Earth's subsurface below the bottom of body of water 11 in response to energy imparted into the subsurface by signal sources 32. Seismic energy, for example, may originate from a seismic signal source, or an array of such sources, deployed in body of water 11 and towed by survey vessel 10. Electromagnetic energy may be provided by passing electric current through a wire loop or electrode pair (not shown for clarity). FIG. 1 shows twenty sensor streamers 20, while FIG. 2 shows only four. One of ordinary skill in the art will recognize that this disclosure may be applied to any number of sensor streamers 20 towed behind survey vessel 10, including none, one, or more than one. In some embodiments, a second survey vessel (not shown) may tow one or more sensor streamers 20.

As described above, it may in some embodiments be advantageous to tow signal sources 32 at relatively wide separations. For example, measuring the distance between two signal sources 32 at the largest lateral separation from one another, in some embodiments it may be desirable to tow signal sources 32 at a separation of at least 300 meters; in other embodiments it may be advantageous to tow them at a separation of at least 600 meters; in still other embodiments it may be advantageous to tow them at a separation of at least 800 meters; in still other embodiments it may be advantageous to tow them at a separation of at least 1000 meters. One of ordinary skill in the art will understand that the desired separation between signal sources 32 may depend upon the length of source cables 30 (or upon the deployed length of source cables 30 when source cables 30 are deployed to less than their full length) in some embodiments. For example, for longer source cables 30, larger lateral separations may be desirable and obtainable.

In the survey system shown in FIG. 2, for example, there are four sensor streamers 20 towed by survey vessel 10. On of ordinary skill in the art will understand that the number of sensor streamers shown in FIG. 2 is only for purposes of illustration. Streamers 20 are typically coupled to towing equipment that secures the forward end of each of streamers 20 at a selected lateral position with respect to adjacent streamers and with respect to survey vessel 10. As shown in FIGS. 1 and 2, the towing equipment may include two paravanes 14 coupled to survey vessel 10 via paravane tow ropes 8. Paravanes 14 are typically the outermost components in the streamer spread and are used to provide streamer separation.

Paravane tow ropes 8 may each be coupled to survey vessel 10 at one end through winch 19 or a similar spooling device that enables changing the deployed length of each paravane tow rope 8. In the embodiment shown, the distal end of each paravane tow rope 8 is coupled to paravanes 14. Paravanes 14 are each shaped to provide a lateral component of motion to the various towing components deployed in body of water 11 when paravanes 14 are moved therethrough. The lateral motion component of each paravane 14 is opposed to that of the other paravane 14. The combined lateral motion component of paravanes 14 separates paravanes 14 from each other until they put into tension one or more spreader ropes or cables 24, coupled end to end between paravanes 14.

Streamers 20 may each be coupled, at the axial end thereof nearest survey vessel 10 (the "forward end"), to respective lead-in cable terminations 20A. Lead-in cable terminations 20A may be coupled to or associated with spreader ropes or cables 24 so as to fix the lateral positions of streamers 20 with respect to each other and with respect to the centerline of survey vessel 10. Electrical, optical, and/or any other suitable connection between the appropriate components in recording system 12 and, ultimately, geophysical sensors 22 (and/or other circuitry) in the ones of streamers 20 inward of the lateral edges of the system may be made using inner lead-in cables 18, each of which terminates in respective lead-in cable termination 20A. Lead-in termination 20A is disposed at the forward end of each streamer 20. Corresponding electrical, optical, and/or other suitable connection between the appropriate components of recording system 12 and geophysical sensors 22 in the laterally outermost streamers 20 may be made through respective lead-in terminations 20A, using outermost lead-in cables 16. Each of innermost lead-in cables 18 and outermost lead-in cables 16 may be deployed by respective winches 19 or similar spooling devices such that the deployed length of each cable 16, 18 may be changed. Similarly to streamer lead-in cables 16 and 18, source cables 30 may be deployed by respective winches 19 or similar spooling devices such that the deployed length of each source cable 30 may be changed as desired.

The type of towing equipment coupled to the forward end of each streamer shown in FIGS. 1 and 2 is only intended to illustrate a particular type of equipment that can tow an array of laterally spaced-apart streamers in the water. Other towing structures may be used in other examples of geophysical acquisition system according to the present disclosure.

The acquisition system shown in FIG. 2 may also include a plurality of lateral control devices 26 coupled to each streamer 20 at selected positions along each streamer 20. Each lateral control device 26 may include one or more rotatable control surfaces (not shown separately in FIG. 2) that when moved to a selected rotary orientation with respect to the direction of movement of such surfaces through the water 11 creates a hydrodynamic lift in a selected direction to urge streamer 20 in a selected direction. Thus, such lateral control devices 26 may be used to maintain streamers 20 in a selected orientation. Each streamer 20 may include lateral control devices 26 which may impart forces to the streamer in selected directions. Each streamer may include range sensing devices 26A and/or 23, heading sensors 29, and a tail buoy 25, which may include a geodetic position receiver 25A. Using these elements, survey equipment 12 may be configured to determine and control positions of streamers 20.

During operation of the geophysical acquisition system shown in FIGS. 1 and 2, it may be desirable to adjust portions of streamers 20 and signal sources 32 laterally in order to maintain a desired streamer and source orientation during geophysical surveying. In some embodiments, recording system 12 may be configured to send suitable control signals to each lateral control device 26 to move associated portions of each streamer 20 laterally. Such lateral motion may be selected so that each point along each streamer is located at a predetermined relative position at any moment in time. The relative positions may be referenced to the position of either survey vessel 10 or signal sources 32.

Recording system 12 may also be used to adjust the positions of signal sources 32. Various techniques are known for adjusting both the depth and the lateral position of signal sources 32. For example, wings may be disposed either along source cables 30 or at signal sources 32. Such wings may provide vertical and/or lateral lift forces to position signal sources 32 as desired. Further, floats may be used at signal sources 32 to provide buoyant force for purposes of attaining a desired depth. For example, in one embodiment of a seismic surveying system, signal source 32 may include a buoyant hull with a plurality of air guns hanging below the hull. Various other arrangements are also known in the art.

Figure 3:
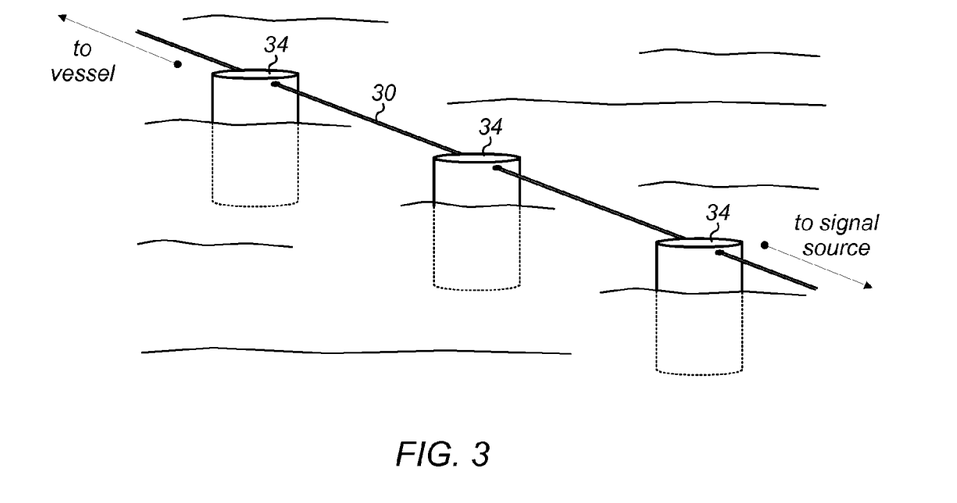
FIG. 3 depicts a perspective view of a source cable.
Figure 4:
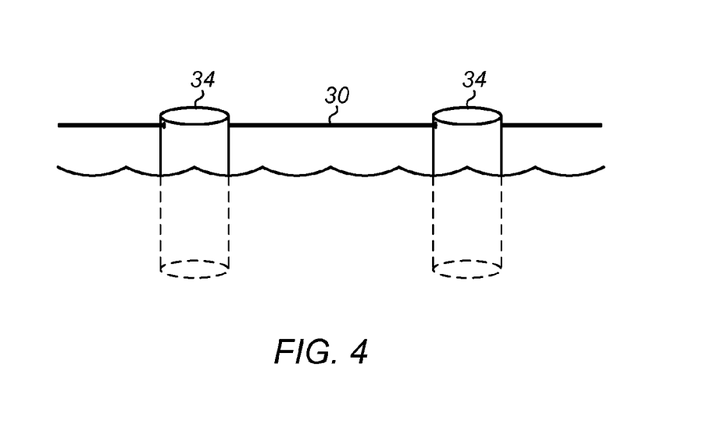
FIG. 4 depicts a side view of a source cable.

Turning now to FIGS. 3 and 4, isometric and side views, respectively, are provided showing source cable 30 with a plurality of buoyant members arranged therealong. In this embodiment, floats 34 are used to lift portions of source cable 30 above the surface of the water. Lifting source cable 30 out of the water may offer the advantage of reduced hydrodynamic drag along the length of the cable. This consideration may be particularly important in embodiments with relatively long source cables 30, or embodiments in which sources 32 are desired to be towed at relatively wide lateral separation. This is due to the fact that at wide separation, drag along source cable 30 is increased because it is not being pulled through the water along its longitudinal axis, but at some angle relative to that axis.

In some embodiments, the entirety of source cable 30 (measured from the connection to the survey vessel 10 to the connection to the signal source 32) is lifted above the surface of the water. In other embodiments, at least 80% of the length of source cable 30 is lifted above the surface of the water. In still other embodiments, at least 50% of source cable 30 is lifted above the surface of the water. Floats 34 are not necessarily shown to scale—one of ordinary skill in the art will recognize that various seaworthiness considerations may affect the determination of the dimensions of floats 34.

In some embodiments, floats 34 may also be arranged as deflecting devices, so that in addition to lifting source cable 30 out of the water, they also provide a lateral force to source cable 30 and thus to signal source 32. This embodiment is illustrated particularly in FIG. 3, which shows floats 34 having a wing shape angled with respect to the axis of source cable 30.

In the embodiment shown in FIGS. 3 and 4, source cable 30 passes through floats 34. One of ordinary skill in the art will envision other possible arrangements, however. For example, in some embodiments, source cable 30 may be attached to a top surface or a side surface of floats 34.

In order to provide the desired lateral force, the angle of floats 34 relative to the axis of source cable 30 may be, in various embodiments, either preselected or adjustable. For example, in some embodiments floats 34 may be constructed such that source cable 30 passes therethrough at a fixed angle. In other embodiments, float 34 may include a mechanism for adjusting the angle. For example, a motor, a hydraulic actuator, or a pneumatic actuator may be used. The mechanism for adjusting the angle may be controlled in various ways—for example, it may be controlled from survey vessel 10 by recording system 12. One of ordinary skill in the art with the benefit of this disclosure would be able to select appropriate mechanisms for controlling the lateral force.

Floats 34 may be attached along source cable 30 either prior to deployment of source cable 30 in the water or after such deployment. For example, floats 34 may be permanently attached to source cable 30; they may be attached to source cable 30 on survey vessel 10 at the time of deployment; or they may be deployed after source cable 30 is already in the water by sliding them along source cable 30 until they reach the correct position, at which point they may be secured in position.

In order for source cable 30 to support itself above the surface of the water, it may in some embodiments be advantageous for source cable 30 to be stiff or partially stiff. For example, for purposes of source cable 30 supporting itself above the surface of the water, a desired stiffness may be dependent upon the separations between floats 34. For example, for large separations between floats 34, a higher degree of stiffness in source cable 30 may be advantageous in order for source cable 30 to support itself at a height above the surface of the water. In general, for embodiments using stiff cables, source cable 30 may advantageously have a stiffness sufficient to allow it to ride above the surface of the water, given a particular separation distance between floats 34.

Too much rigidity, however, may lead to breakage of source cable 30. Accordingly, in some embodiments of this disclosure, portions of source cable 30 may be stiff and other portions may be more flexible. For example, stiff portions and flexible portions may be interleaved along the length of source cable 30. By "interleaved," it is meant that stiff and flexible portions are alternated along the length of source cable 30. In one embodiment, the portions of source cable 30 between floats 34 may be stiff portions, and the portions attached to floats 34 (or the portions near floats 34) may be flexible portions.

Depending on various considerations, such as the stiffness of source cable 30, the height to which floats 34 lift source cable above the surface of the water, and other possible considerations, various spacings between floats 34 may be used. For example, in some embodiments, a spacing of 30 meters between individual ones of floats 34 may be advantageous. In other embodiments, a spacing of 50 meters may be advantageous. In yet other embodiments, even larger separations may be advantageous, optionally with the use of stiffer source cables 34.

Due to the advantages of reducing drag along a cable being towed in the water, one of ordinary skill in the art will recognize that the present disclosure may have applications outside its use on signal source cables. For example, embodiments of the present disclosure may be used on lead-in cables 16 and 18, on paravane tow ropes 8, and/or on other cables being towed in the water.

Figure 5:
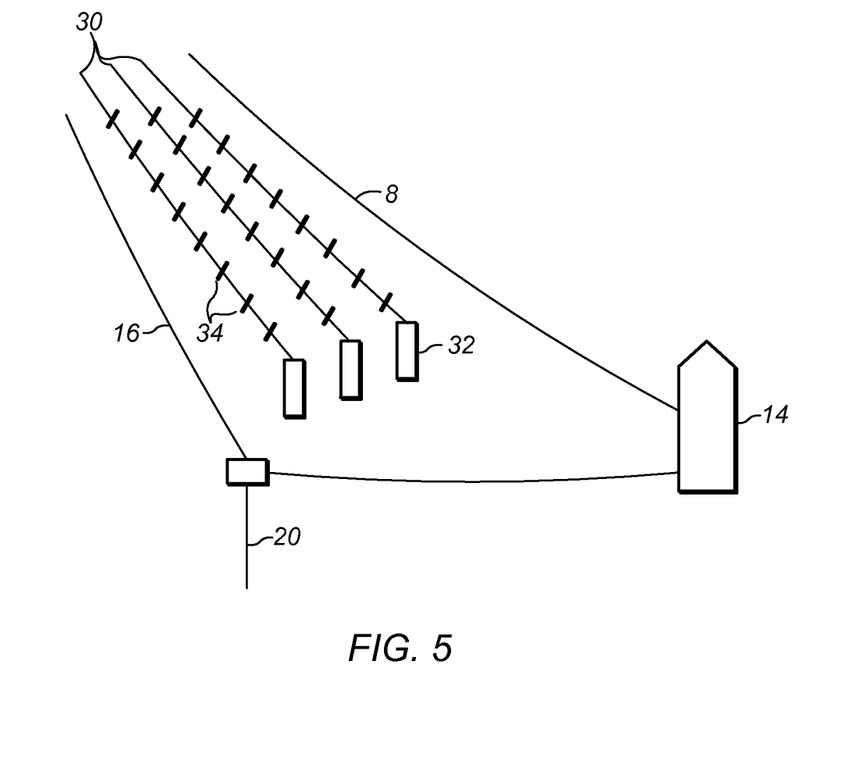
FIG. 5 depicts a top view of a group of sources and source cables according to the present disclosure.

Turning now to FIG. 5, a top detailed view of an embodiment of this disclosure is shown, in which three signal sources 32 are being towed by corresponding source cables 30. In the embodiment of FIG. 5, a plurality of buoyant deflectors 34 are arranged along each source cable 30. As noted above, when towing signal sources 32 at relatively wide lateral separations, source cables 30 may make a substantial angle with respect to the direction of motion of survey vessel 10. This in turn may tend to cause increased drag forces, which may increase the amount of fuel required for a survey, decrease survey speed, and/or limit the maximum attainable lateral separation of signal sources 32. Accordingly, the use of the present disclosure in reducing drag on source cables 30 may ameliorate some of these problems.

Figure 6:
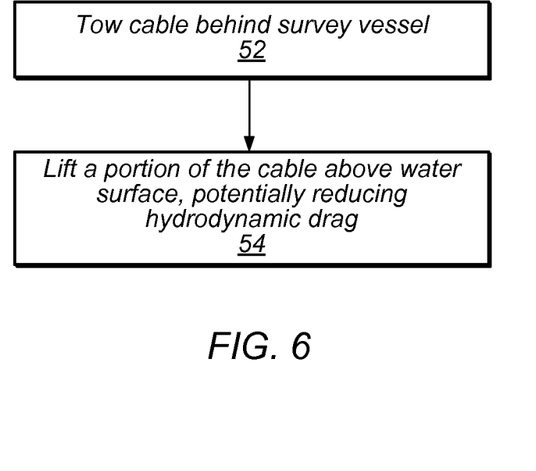
FIG. 6 depicts a process flow according to the present disclosure.

Turning now to FIG. 6, an exemplary process flow for an embodiment according to the present disclosure is shown. At step 52, a cable is towed behind a survey vessel. As noted above, the cable may be, for example, a source cable, a lead-in cable, a paravane tow rope, etc.

At step 54, a portion of the cable is lifted above the surface of the water, potentially reducing the drag experienced by the cable. Floats 34, described above, are one possible way of achieving this. Floats 34 may include deflecting surfaces (e.g. wings) in order to provide lateral force to the cable.

* * *

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments covered by the claims may provide some, all, or none of such advantages. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a survey source cable with a connection for a survey vessel and a connection for a survey source; and
   a plurality of floats arranged along the survey source cable between the connection for the survey vessel and the connection for the survey source, wherein the floats include a corresponding plurality of lateral deflectors operable to impart lateral force to the survey source cable; wherein the plurality of floats are operable to lift the survey source cable at least partially out of the body of water.

2. The apparatus of claim 1, wherein at least a portion of the survey source cable has a stiffness sufficient for the plurality of floats to support the survey source cable entirely out of the body of water.

3. The apparatus of claim 2, wherein the survey source cable includes a plurality of stiff segments interleaved with a plurality of flexible segments, wherein the stiff segments have a stiffness greater than the flexible segments.

4. The apparatus of claim 3, wherein the plurality of floats are attached to the survey source cable within various ones of the plurality of flexible segments.

5. The apparatus of claim 1, wherein one or more of the plurality of floats are configured to create a buoyant force sufficient to lift at least 50% of the source cable above a surface of the body of water.

6. The apparatus of claim 1, wherein the survey source further includes a float and a lateral deflector.

7. The apparatus of claim 1, wherein the survey source includes a signal source.

8. The apparatus of claim 7, wherein the signal source includes at least one source selected from the group consisting of: an air gun, a marine vibrator, an electromagnetic signal source.

9. A method, comprising:
   towing a cable behind a survey vessel in a body of water; wherein the cable includes, at selected positions therealong, a plurality of buoyant members, the buoyant members including lateral deflectors, and a geophysical survey source at a rear portion of the cable; and
   lifting at least a segment of the cable above a surface of the body of water with the plurality of buoyant members.

10. The method of claim 9, wherein the at least a segment of the cable includes at least 50% of the cable.

11. The method of claim 9, further comprising:
   deploying the cable from the survey vessel;
   sliding the buoyant members along the cable; and
   affixing the buoyant members at the selected positions.

12. The method of claim 9, wherein the cable further includes a lateral deflector at a rear portion thereof.

13. The method of claim 9, wherein the geophysical survey source comprises:
   a buoyant portion; and
   an array of seismic sources suspended from the buoyant portion.

14. The method of claim 9, further comprising actuating, at selected times, the geophysical survey source.

15. A system, comprising:
   a plurality of cables towable behind a survey vessel in a body of water; and
   a corresponding plurality of marine seismic sources connectable to the plurality of cables; at connection points; wherein the cables include a plurality of flotation devices at selected positions therealong different from the connection points, the flotation devices including wings; and
   wherein the flotation devices are operable to position portions of the cables at a height above a surface of the body of water, and wherein the wings are operable to position the cables at selected lateral positions.

16. The system of claim 15, wherein the marine seismic sources are marine seismic source arrays.

17. The system of claim 15, wherein a separation between a first of the plurality of marine seismic sources and a second of the plurality of marine seismic sources is at least 600 meters.

18. The system of claim 15, further including a plurality of seismic sensor streamers towable behind the survey vessel in the body of water.

* * * * *